United States Patent
Yu et al.

(10) Patent No.: US 11,899,943 B2
(45) Date of Patent: Feb. 13, 2024

(54) NODE INTERCONNECTION APPARATUS, RESOURCE CONTROL NODE, AND SERVER SYSTEM

(71) Applicant: Huawei Technologies Co., Ltd., Shenzhen (CN)

(72) Inventors: Baifeng Yu, Hangzhou (CN); Zhou Yu, Shenzhen (CN); Jiongjiong Gu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 190 days.

(21) Appl. No.: 17/232,879

(22) Filed: Apr. 16, 2021

(65) Prior Publication Data

US 2021/0240367 A1 Aug. 5, 2021

Related U.S. Application Data

(63) Continuation of application No. 16/416,280, filed on May 20, 2019, now Pat. No. 11,023,143, which is a continuation of application No. 15/296,054, filed on Oct. 18, 2016, now Pat. No. 10,310,756, which is a continuation of application No. PCT/CN2014/078075, filed on May 22, 2014.

(51) Int. Cl.
*G06F 3/06* (2006.01)
*G06F 9/4401* (2018.01)
(Continued)

(52) U.S. Cl.
CPC .......... *G06F 3/0625* (2013.01); *G06F 1/3203* (2013.01); *G06F 1/3221* (2013.01);
(Continued)

(58) Field of Classification Search
CPC .... G06F 1/3203; G06F 1/3221; G06F 1/3225; G06F 1/3234; G06F 1/3268;
(Continued)

(56) References Cited

U.S. PATENT DOCUMENTS 8,380,967 B2 2/2013 Kinouchi
9,621,551 B2 4/2017 Lambert et al.
(Continued)

FOREIGN PATENT DOCUMENTS

| CN | 1602480 A | 3/2005 |
| CN | 1707416 A | 12/2005 |

(Continued)

OTHER PUBLICATIONS

IBM Company, "SVC IBM solutions for heterogeneous storage integration solutions" 26 pages with partial translation.

*Primary Examiner* — Terrell S Johnson
(74) *Attorney, Agent, or Firm* — Conley Rose, P.C.

(57) ABSTRACT

A node interconnection apparatus includes a computing node and a resource control node, and a device interconnection interface connecting the two. Each of the computing node and the resource control node includes a processing unit and a storage unit, and the resource control node further includes a resource interface for connecting with a network storage device. The resource control node manages storage resource of the network storage device, and when the computing node needs to start up, the resource control node obtains operating system startup information from the network storage device and provides the information to the computing node. The computing node can start up without the need for storing startup information locally.

20 Claims, 9 Drawing Sheets

(51) Int. Cl.
*H04L 67/1097* (2022.01)
*G06F 1/3221* (2019.01)
*G06F 1/3225* (2019.01)
*G06F 1/3234* (2019.01)
*G06F 1/3287* (2019.01)
*H04L 47/70* (2022.01)
*G06F 1/3203* (2019.01)

(52) U.S. Cl.
CPC .......... *G06F 1/3225* (2013.01); *G06F 1/3234* (2013.01); *G06F 1/3268* (2013.01); *G06F 1/3275* (2013.01); *G06F 1/3287* (2013.01); *G06F 3/067* (2013.01); *G06F 3/0619* (2013.01); *G06F 3/0631* (2013.01); *G06F 3/0662* (2013.01); *G06F 3/0665* (2013.01); *G06F 3/0683* (2013.01); *G06F 3/0689* (2013.01); *G06F 9/4401* (2013.01); *G06F 9/4418* (2013.01); *H04L 47/70* (2013.01); *H04L 67/1097* (2013.01); *Y02D 10/00* (2018.01); *Y02D 30/00* (2018.01)

(58) Field of Classification Search
CPC .... G06F 1/3275; G06F 1/3287; G06F 3/0619; G06F 3/0625; G06F 3/0631; G06F 3/0662; G06F 3/0665; G06F 3/067; G06F 3/0683; G06F 3/0689; G06F 9/4401; G06F 9/4418; H04L 47/70; H04L 67/1097; Y02D 10/00; Y02D 30/00; Y02D 30/05
See application file for complete search history.

(56) References Cited

U.S. PATENT DOCUMENTS

| | | | |
|---|---|---|---|
| 11,023,143 B2* | 6/2021 | Yu | G06F 1/3287 |
| 2003/0110263 A1 | 6/2003 | Avraham | |
| 2007/0050644 A1 | 3/2007 | Merkin et al. | |
| 2008/0133902 A1 | 6/2008 | Love | |
| 2010/0017630 A1 | 1/2010 | Chen et al. | |
| 2010/0083015 A1 | 4/2010 | Yokota et al. | |
| 2010/0106990 A1 | 4/2010 | Kalman et al. | |
| 2010/0115305 A1 | 5/2010 | Ichikawa et al. | |
| 2010/0192145 A1 | 7/2010 | Liles et al. | |
| 2010/0244778 A1 | 9/2010 | Chuang et al. | |
| 2011/0087833 A1 | 4/2011 | Jones et al. | |
| 2011/0202193 A1 | 8/2011 | Craig et al. | |
| 2011/0202219 A1 | 8/2011 | Jason et al. | |
| 2012/0150815 A1 | 6/2012 | Pafumi et al. | |
| 2012/0173863 A1 | 7/2012 | Xing-Hua | |
| 2013/0339600 A1 | 12/2013 | Shah | |
| 2014/0047144 A1* | 2/2014 | Haga | G06F 9/45558 710/74 |
| 2014/0189128 A1 | 7/2014 | Jiongjiong et al. | |
| 2015/0032910 A1* | 1/2015 | Ben Yehuda | G06F 21/85 710/15 |
| 2015/0154227 A1 | 6/2015 | Wang et al. | |
| 2015/0212856 A1* | 7/2015 | Shanmuganathan | G06F 9/5077 709/226 |
| 2015/0304423 A1* | 10/2015 | Satoyama | H04L 67/1097 709/223 |
| 2017/0371683 A1 | 12/2017 | Devireddy et al. | |

FOREIGN PATENT DOCUMENTS

| | | |
|---|---|---|
| CN | 101281454 A | 10/2008 |
| CN | 101604196 A | 12/2009 |
| CN | 101661381 A | 3/2010 |
| CN | 102568505 A | 7/2012 |
| CN | 102759977 A | 10/2012 |
| CN | 102893233 A | 1/2013 |
| CN | 102902334 A | 1/2013 |
| CN | 103092807 A | 5/2013 |
| CN | 103389884 A | 11/2013 |
| CN | 103458041 A | 12/2013 |
| CN | 103503414 A | 1/2014 |
| EP | 2133771 A2 | 12/2009 |
| WO | 03050707 A1 | 6/2003 |

* cited by examiner

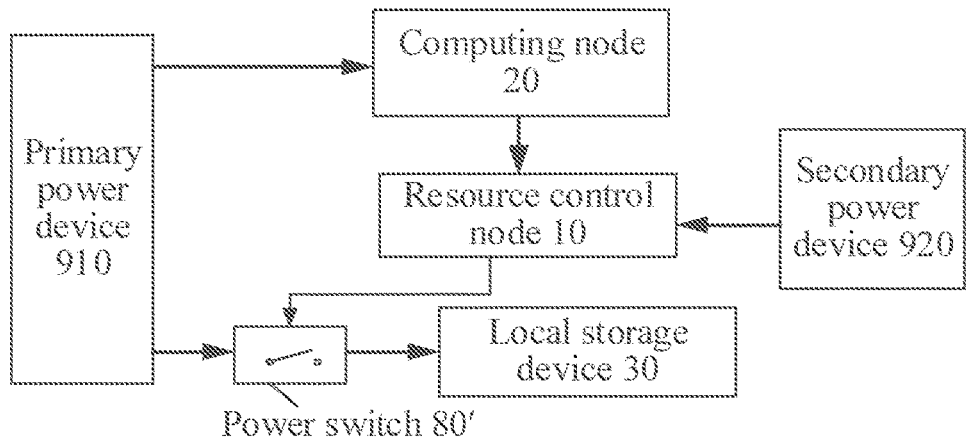

FIG. 6B

| After being started, a primary power device in a converged server simultaneously supplies power to a resource control node and a computing node in the converged server, and a power on operation is separately performed on the resource control node and the computing node | 701 |

| After being powered on, the computing node acquires startup mode information during startup, and enters a power saving mode of a BIOS according to the startup mode information | 702 |

| After being powered on, the resource control node starts an OS of the resource control node | 703 |

| After it is determined that the resource control node is started, the computing node is switched from the power saving mode of the BIOS to a boot mode of the BIOS, and starts an OS of the computing node | 704 |

| After being started, the resource control node or the computing node registers with an energy saving management server, so that the energy saving management server learns a startup state of the computing node | 705 |

FIG. 7

NODE INTERCONNECTION APPARATUS, RESOURCE CONTROL NODE, AND SERVER SYSTEM

CROSS-REFERENCE TO RELATED APPLICATIONS

This is a continuation of U.S. patent application Ser. No. 16/416,280, filed on May 20, 2019, which is a continuation of U.S. patent application Ser. No. 15/296,054, filed on Oct. 18, 2016, which is a continuation of Int'l Patent App. No. PCT/CN2014/078075, filed on May 22, 2014, all of which are incorporated by reference.

FIELD

The present application relates to the field of information technology (IT), and in particular, to a node interconnection apparatus, a resource control node, and a server system.

BACKGROUND

In conventional construction of infrastructure of a data center, servers, storages, and network equipment are separately purchased and subsequently integrated. This may result in inadequate service agility, excessive hardware cost, low resource utilization, and high energy consumption. The development of the Internet revolutionized the conventional construction mode of the infrastructure of a conventional data center. For example, scale-out distributed storage based on X86 servers, and operation and maintenance automation of an ultra-large-scale platform have greatly reduced the cost of the infrastructure of a data center. With the outbreak of big data applications and development of cloud computing and virtualization technologies, people pay increasing attention to costs of data centers (especially power consumption of the data centers). How to use fewer computing, storage, and network components while ensuring services, so as to minimize energy consumption, has become one of the goals that the industry is striving for.

In the existing technology, a server node in a data center is required to remain in a power-on state in order to access a storage resource. For example, when a server node accesses a storage resource of itself, the server needs to remain in the power-on state. For another example, when a server node accesses a storage resource of another server node, not only the server node itself needs to be in the power-on state, but also the accessed server node needs to be in the power-on state. Such a resource utilization manner is not beneficial to energy saving of the data center. Especially, even though there are idling computing resources on a server, an energy-saving operation cannot be performed on the server.

SUMMARY

Embodiments of the present application provide a node interconnection apparatus, a resource control node, and a server system, aimed to separate a resource access function from a computing node, thereby improving efficiency of the computing node or reducing energy consumption of the computing node.

According to a first aspect, an embodiment of the present application provides a node interconnection apparatus, including: a resource control node and a computing node, where: the computing node and the resource control node are connected by using a device interconnection interface; the resource control node is provided with a resource interface, and the resource control node is configured to access a storage device by using the resource interface, and allocate a storage resource that belongs to the computing node; the computing node is configured to obtain the storage resource allocated by the resource control node, and when an operation requirement of the allocated storage resource is generated, send an access request for the allocated storage resource to the resource control node by using the device interconnection interface; and the resource control node receives the access request, which is sent by the computing node, for the allocated storage resource, and performs, by using the resource interface, a storage operation on the allocated storage resource, where: the resource interface includes a storage interface and/or a network interface, and the resource control node accesses a local storage device by using the storage interface, and accesses an external storage device by using the network interface.

According to a second aspect, an embodiment of the present application provides another node interconnection apparatus, including: a resource control node and a computing node, where: the computing node and the resource control node are connected by using a device interconnection interface; the resource control node is provided with a resource interface, and the resource control node is configured to access a storage device by using the resource interface; and the node interconnection apparatus further includes: a primary power device, where: the primary power device directly supplies power to the resource control node, and the primary power device supplies power to the computing node by using a power switch; and before a power-on operation is performed on the resource control node, the power switch opens a power supply circuit between the primary power device and the computing node.

According to a third aspect, an embodiment of the present application provides another node interconnection apparatus, including: a resource control node and a computing node, where: the computing node and the resource control node are connected by using a device interconnection interface; the resource control node is provided with a resource interface, and the resource control node is configured to access a storage device by using the resource interface; and the node interconnection apparatus further includes: a primary power device configured to supply power to the resource control node and the computing node, where: when the primary power device is started, the resource control node and the computing node simultaneously obtain power supplied by the primary power device; and after a power-on operation is performed on the resource control node and the computing node, and before the resource control node is started, the computing node is further configured to acquire startup mode information, and enter a power saving mode of a basic input/output system (BIOS) according to the startup mode information.

According to a fourth aspect, an embodiment of the present application provides a resource control apparatus, including the resource control node according to the first aspect, second aspect, or third aspect described above.

According to a fifth aspect, an embodiment of the present application provides a server system, including multiple node interconnection apparatuses that are interconnected, where: the server system further includes an energy saving management server, where: the energy saving management server is configured to receive a registration notification that is sent by a resource control node in each node interconnection apparatus after a power-on operation is performed on the resource control node, and send a computing node power-on indication to the resource control node in each node interconnection apparatus or a baseboard management controller in each node interconnection apparatus, so that the resource control node in each node interconnection apparatus or the baseboard management controller in each node interconnection apparatus controls a power switch according to the computing node power-on indication to close a power supply circuit between a primary power device and a computing node.

According to a sixth aspect, an embodiment of the present application provides a server system, including multiple node interconnection apparatuses that are interconnected, where: the server system further includes an energy saving management server configured to determine, according to an energy saving policy, whether an energy saving operation needs to be performed on a computing node in each node interconnection apparatus, and send an energy saving operation indication to a computing node on which an energy saving operation is to be performed; and the computing node in each node interconnection apparatus is further configured to enter an energy saving mode of an operating system according to the received energy saving operation indication.

According to a seventh aspect, an embodiment of the present application provides a server system, including an integrated apparatus and multiple servers, where: each server includes a computing node, the integrated apparatus includes multiple resource control nodes, the multiple resource control nodes are interconnected, and the multiple resource control nodes are connected to the computing node in each server by using multiple device interconnection interfaces; each resource control node is provided with a resource interface, and each resource control node is configured to access a storage device by using the resource interface, and allocate, to a computing node connected to the resource control node, a storage resource that belongs to the computing node; the computing node is configured to obtain the storage resource allocated by the resource control node connected to the computing node, and send, by using the device interconnection interface, an access request for the allocated storage resource to the resource control node connected to the computing node; and each resource control node receives the access request, which is sent by the computing node connected to the resource control node, for the allocated storage resource, and performs, by using the resource interface, an operation on the allocated storage resource, where: the resource interface includes a storage interface and/or a network interface, and the resource control node accesses a local storage device by using the storage interface, and accesses an external storage device by using the network interface. It can be learn from the foregoing technical solutions that the node interconnection apparatus provided in the embodiments of the present application includes a resource control node and a computing node, and because the computing node is not provided with a resource interface, the computing node obtains a storage resource or a network resource by using the resource control node; the resource control node is configured to access a storage device by using a resource interface, and allocate a storage resource that belongs to the computing node; the computing node is configured to obtain the storage resource allocated by the resource control node, and when an operation requirement of the allocated storage resource is generated, send an operation request for the allocated storage resource to the resource control node by using a device interconnection interface; and the resource control node receives the operation request, which is sent by the computing node, for the allocated storage resource, and performs, by using the resource interface, a storage operation on the allocated storage resource.

Different from a conventional server, the node interconnection apparatus provided in the embodiments of the present application uses an architecture in which a computing node and a resource control node are separate and decoupled. The node interconnection apparatus includes a computing node that is used to perform a computing task, and a resource control node that is used to perform resource access. Processors are separately configured for the computing node and the resource control node. The computing node is not responsible for accessing storage devices, and storage resources can only be acquired by using the resource control node. Therefore, the computing tasks and the resource access tasks can be performed separately. On one hand, when the computing node is not powered off, load of it can be reduced, resources are concentrated on computing functions, and computing efficiency is improved. On the other hand, the resource access tasks are separated from the computing node, so that when energy saving is required for the computing node, an energy saving operation, such as not starting, power-off, or entering power saving mode may be performed on the computing node, without affecting the use of a network resource or a storage resource, thereby reducing energy consumption.

BRIEF DESCRIPTION OF THE DRAWINGS

The following briefly introduces the accompanying drawings used in describing the embodiments of the present application.

FIG. 6A and FIG. 6B are schematic block diagrams of a second power supply system for a node interconnection apparatus according to an embodiment of the present application; and FIG. 7 is a flowchart of starting another node interconnection apparatus according to an embodiment of the present application.

DETAILED DESCRIPTION

Figures 1A, 1B:
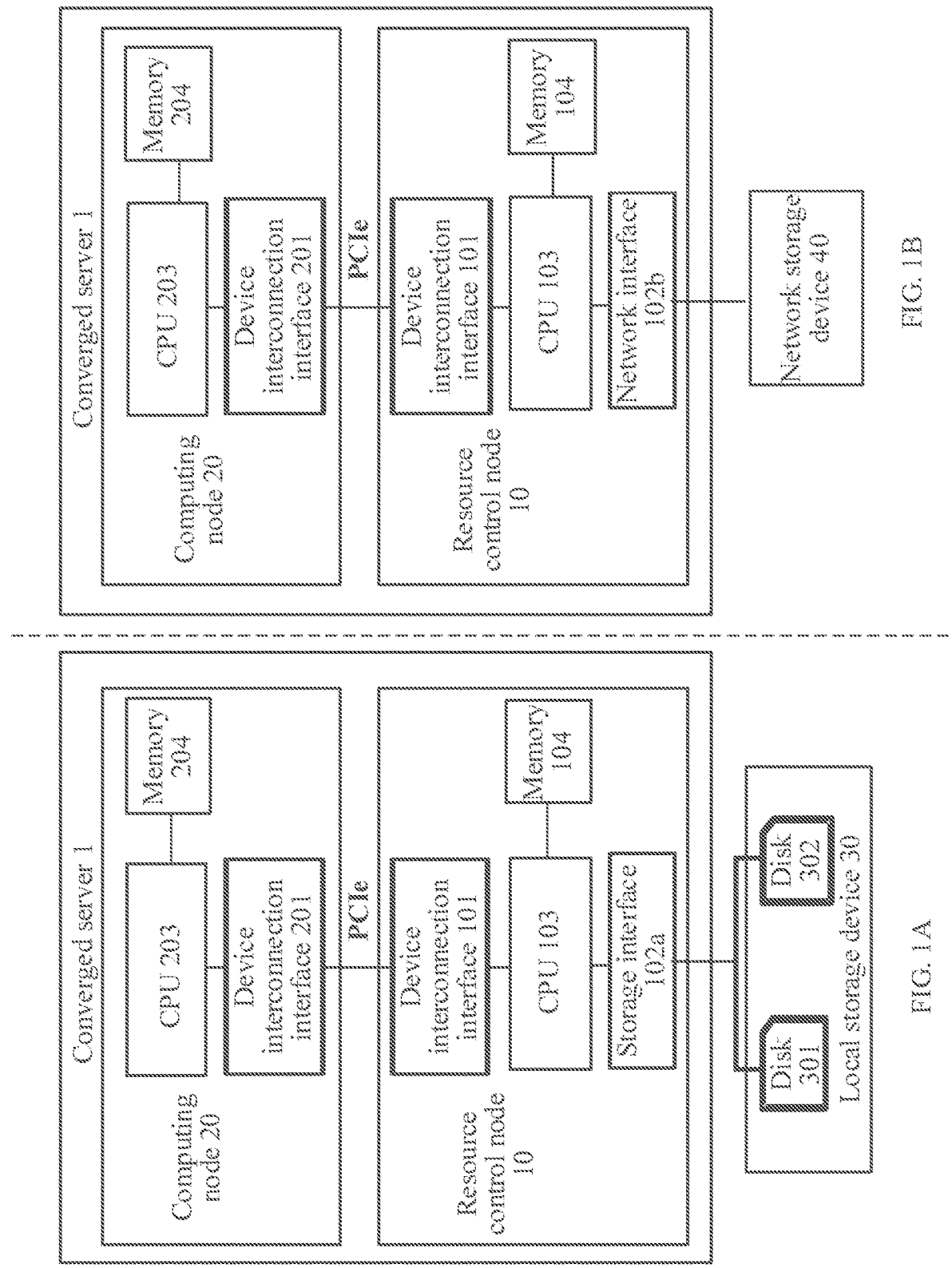
FIG. 1A, FIG. 1B, and FIG. 1C are schematic diagrams of three forms of converged servers according to an embodiment of the present application.

Embodiments of the present application provide a node interconnection apparatus, a resource control node, and a server system. In the node interconnection apparatus, resource access functions are dissociated from a computing node, and a resource control node is provided to handle the resource access functions. The resource control node is connected to the computing node by a device interconnection interface. The resource control node has a resource interface, for accessing a storage resource or a network resource. The resource control node also has a storage controller or a network controller, to control the access to the storage resource or the network resource.

Correspondingly, the computing node that is connected to the resource control node does not need to provide functions related to the storage controller or the network controller any more. The resource control node is configured to access a storage device or a network through the resource interface, allocate a storage resource or a network resource that belongs to the computing node, receive an access request, which is sent by the computing node, for the allocated storage resource or the allocated network resource, and perform a storage operation on the allocated storage resource or access the allocated network resource by using the resource interface.

The resource interface described above includes a storage interface and/or a network interface, and the resource control node accesses a local storage device by using the storage interface, and accesses an external storage device by using the network interface.

The node interconnection apparatus, which includes a resource control node and a computing node that are interconnected, can be flexibly implemented. Possible implementation manners include:

(1) A brand-new form of server, for example, a converged server, where the converged server includes a computing node and a resource control node.

(2) A resource control node is connected as a submodule to an existing server, where the resource control node may replace an original Redundant Arrays of Independent Disks (RAID), card and an original network interface card (NIC). A signal interface, through which the original RAID card is connected to a hard disk, is connected to a storage interface of the resource control node. A network interface, through which the original NIC card is connected externally or is connected to a self-organizing network, is connected to a network interface of the resource control node. The resource control node may be deemed as a device locally connected to the existing server.

(3) An integrated apparatus formed by multiple resource control nodes. For example, multiple resource control nodes are deployed in a cabinet/frame, and each resource control node is connected to a server through a device interconnection interface. The integrated resource control nodes are internally interconnected through network interfaces. A local storage device is mounted (or not mounted) to each resource control node, and each resource control node provides a device interconnection interface for access to a computing node, so as to provide storage space, a node communication network, and an external network storage service for a computing node corresponding to each resource control node. The computing node may be a computing node in a server, or may be a computing node group formed by computing nodes of multiple servers.

This embodiment of the present application is described below by using the first implementation manner as an example, where in the first implementation manner, the node interconnection apparatus takes the form of a converged server.

Figure 1C:
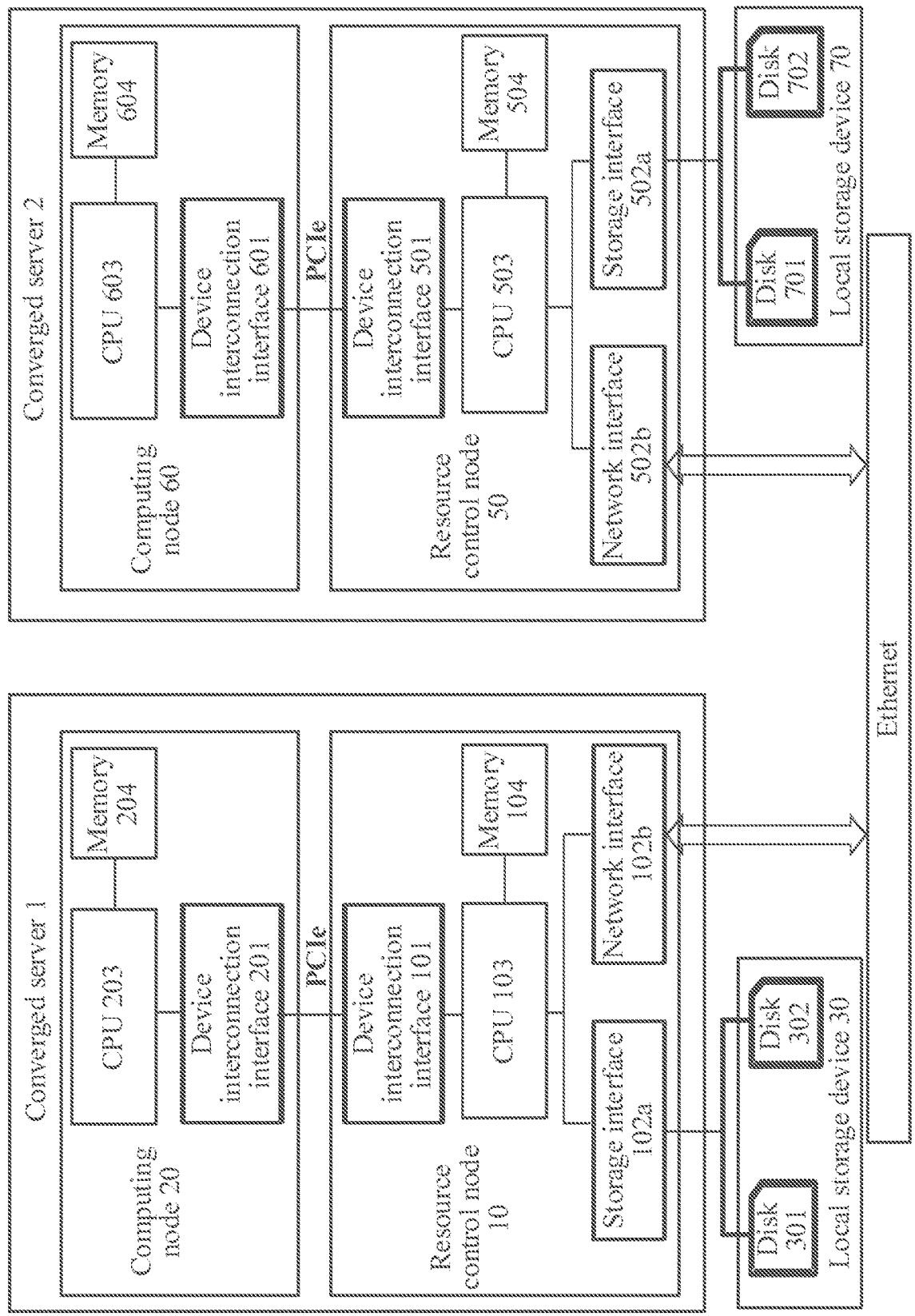

Shown in FIG. 1A. FIG. 1B, and FIG. 1C are block diagrams of the converged server in different connection configurations. The converged server 1 includes a resource control node 10 and a computing node 20. The resource control node 10 and the computing node 20 may be separately implemented by general-purpose computers. The resource control node 10 and the computing node 20 may each include a central processing unit (CPU) (103, 203), a memory (104, 204) and a device interconnection interface (101, 102). The CPU may be formed by one or more processors. Various computer executable instructions may be stored in the memory, so that the CPU executes the instructions. In a preferred implementation manner, the resource control node 10 uses an Acorn RISC Machine (ARM) processor, and the computing node 20 uses an X86 processor.

The resource control node 10 interconnects with the computing node 20 through their respective device interconnection interfaces 101 and 201. The device interconnection interface 101 or 201 may be a Peripheral Component Interconnect Express (PCIe) interface.

The resource control node 10 is further provided with a resource interface 102. The resource interface 102 may be a storage interface 102a, or may be a network interface 102b. The storage interface 102a is used for access to a local storage device 30, and the network interface 102b is used for access to an external network storage device 40.

As shown in FIG. 1A, the converged server 1 further includes a local storage device 30, and the resource interface is a storage interface 102a for access to physical disks 301 and 302 of the local storage device 30. A physical disk may be a hard disk drive (IDD) or a solid-state disk (SSD). The storage interface 102a may be a Serial Advanced Technology Attachment (SATA) interface, a serial attached SCSI (SAS) interface, a PCIe interface or the like.

As shown in FIG. 1B, the resource interface is a network interface 102b for access to a network storage device 40. The network storage device 40 may be a storage area network (SAN).

As shown in FIG. 1C, resource control node 10 of converged server 1 includes both the storage interface 102a and the network interface 102b, and resource control node 50 of converged server 2 includes both the storage interface 502a and the network interface 502b. In the converged server 1, the storage interface 102a is used for access to the physical disks 301 and 302 of the local storage device 30. In the converged server 2, the storage interface 502a is used for access to the physical disks 701 and 702 of the local storage device 70. Resource control node 10 of server 1 and resource control node 50 of server 2 are interconnected via network interface 102b and 502b. A storage resource of a local storage device 70, which may include physical disks 701 and 702, is acquired through storage interface 502a of the resource control node 50.

In the converged server as shown in foregoing FIG. 1A. FIG. 1B, or FIG. 1C, the resource control node 10 is further provided with a storage controller corresponding to the storage interface 102a, or a network controller corresponding to the network interface 102b. Specifically, the storage controller or the network controller may be implemented by a software function module. A corresponding storage control program or network control program may be stored in the memory 104 of the resource control node 10. When the processor 103 of the resource control node 10 executes the storage control program or the network control program, the resource control node 10 implements a function of the storage controller or the network controller.

The converged server provided in this embodiment of the present application includes a resource control node and a computing node. Because the computing node is not provided with a resource interface, the computing node obtains a storage resource or a network resource through the resource control node. The resource control node is configured to access a storage device by using a resource interface, and allocate, according to a storage resource of the storage device, a storage resource that belongs to the computing node. The computing node is configured to obtain the storage resource allocated by the resource control node, and when an operation requirement of the allocated storage resource is generated, send an operation request for the allocated storage resource to the resource control node by using a device interconnection interface. The resource control node receives the operation request for the allocated storage resource, and performs, by using the resource interface, a storage operation on the allocated storage resource.

The allocated storage resource that belongs to the computing node may be all storage resources of the storage device, or may be some storage resources of the storage device.

On a conventional server, because computing work and work of accessing a storage resource or a network resource are all performed by a processor of the server, the server needs to remain in a power-on state, and such a case is not beneficial to an energy saving operation of the server. Different from a conventional server, the converged server provided in this embodiment of the present application uses an architecture in which a computing node and a resource control node are separate and decoupled. The converged server includes both a computing node that is used to perform a computing task, and a resource control node that is used to perform resource access. Processors are separately configured for the computing node and the resource control node. The computing node is not responsible for accessing storage devices, and storage resources can only be acquired by using the resource control node. Therefore, the computing tasks and the resource access tasks can be performed separately. On one hand, when the computing node is not powered off, load of it can be reduced, resources are concentrated on computing functions, and computing efficiency is improved. On the other hand, the resource access tasks are separated from the computing node, so that when energy saving is required for the computing node, an energy saving operation, such as not starting, power-off, or entering power saving mode may be performed on the computing node, without affecting the use of a network resource or a storage resource, thereby reducing energy consumption.

Further, in a preferred implementation manner, the resource control node 10 in the converged server 1 shown in FIG. 1A, FIG. 1B, or FIG. 1C may further be provided with a shared storage scheduling module. The shared storage scheduling module is configured to form a shared storage resource pool by using storage resources acquired by the resource control node 10, and allocate a shared storage resource in the shared source pool to a related computing node. Specifically, the shared storage scheduling module may be implemented by a software function module, and a corresponding shared storage scheduling program is stored in the memory of the resource control node 10. When the processor of the resource control node 10 executes the shared storage scheduling program, the resource control node 10 implements a function of the shared storage scheduling module.

Specifically, the shared storage scheduling module can acquire a storage resource of the local storage device or the external storage device connected to the resource interface 102, form a shared storage resource by using the acquired storage resource, split the shared storage resource into multiple physical storage blocks, recombine the multiple physical storage blocks into multiple virtual disks, allocate a logical address to each virtual disk, save a correspondence between the logical address and a physical address of the virtual disk, and allocate at least one virtual disk to a connected computing node. A physical address of each virtual disk is an address of multiple physical storage blocks that form the virtual disk. For example, in FIG. 1C, the storage interface 102a of the resource control node 10 in the converged server 1 is connected to the physical disks 301 and 302, and the network interface 102b is connected to the physical disks 701 and 702 through resource interface 502 of the converged server 2. The resource control node 10 splits storage resources of the physical disks 301, 302, 701, and 702, recombines the storage resources into two virtual disks, allocates a logical address to each virtual disk, saves a correspondence between the logical address of the virtual disk and a physical address of the physical disk, and finally, allocates the virtual disks to the computing nodes 20 and 50. For example, the resource control node 10 presents a logical address of a virtual disk 1 to the computing node 20, and presents a logical address of a virtual disk 2 to the computing node 60, so that the computing nodes 20 and 60 respectively deem the virtual disks 1 and 2 as physical storage devices. A process of recombining the storage resources of the storage device by the resource control node 10 in FIG. 1A and FIG. 1B are similar to that in FIG. 1C, and details are not described again.

When the computing node 20 is started, the computing node 20 discovers the resource control node 10 by means of scanning through the device interconnection interfaces 201 and 101. After a driver program of the resource control node 10 is loaded to the computing node 20, the computing node 20 acquires the virtual disk 1 provided by the resource control node 10 and deems the virtual disk 1 as a storage resource that belongs to the computing node 20.

The computing node 20 obtains a service request generated by an application program or a virtual machine that is loaded on the computing node 20, and completes a related computing task. If an operation related to the storage resource needs to be performed for the service request, the computing node 20 sends a resource access request to the resource control node 10, where the resource access request carries the logical address of the virtual disk. After receiving the resource access request, the resource control node 10 converts the logical address into the physical address of the storage device, and performs, according to the physical address, an operation related to storage.

In the existing technology, the function of the shared storage scheduling module is implemented by the computing node 20, in other words, the shared storage scheduling program is loaded to the computing node 20. If the computing node 20 is powered off, the shared storage scheduling function of an entire system cannot be implemented, that is, a storage resource cannot be accessed. Therefore, an operation of powering off the computing node 20 for energy saving cannot be implemented. However, in this embodiment of the present application, the function of the shared storage scheduling module is implemented by the resource control node 10. Implementing the function of the shared storage scheduling module by using another hardware device that is decoupled from the computing node 20, that scheduling of the shared storage resource no longer depends on the computing node 20. When energy saving is required for the computing node that performs a computing task, a low power consumption operation can be implemented, for example, separately powering off the computing node or the computing node entering power saving, thereby reducing energy consumption.

Further, in a preferred implementation manner, the resource control node 10 in the converged server 1 shown in FIG. 1A, FIG. 1B, or FIG. 1C may further be provided with a network scheduling module, where the network scheduling module is configured to allocate a network resource acquired by the resource control node 10 to a related computing node. The resource control node 10 provides, according to a service processing bandwidth allocation technology, a required processing bandwidth of storage input/output (IO) and that of network IO for the computing node 20 connected to an uplink port of the device interconnection interface 101. A sum of the bandwidth of the storage IO and that of the network IO are controlled to be within a total bandwidth allowed by the uplink port, and access to these types of IO is implemented by using an internal caching and scheduling technology, so as to meet a quality of service (QoS) requirement of the computing node.

In this embodiment of the present application, a computing node does not directly access a storage device, but access the storage device by using a resource control node. Further, in this embodiment of the present application, it may be further implemented that the computing node is started without an operating system disk. That is, a fixed operating system boot disk (with operating system startup information) does not need to be configured for the computing node, and instead, the resource control node provides the operating system startup information to the computing node. Therefore, after being started, the resource control node is further configured to prepare operating system startup information for the computing node by using the resource interface. During startup of the computing node, the computing node is further configured to obtain, by using the resource control node, the operating system startup information prepared by the resource control node, and start the operating system of the computing node according to the operating system startup information.

The node interconnection apparatus, in which the computing node and the resource control node are decoupled, provided in this embodiment of the present application enables the computing node to be separately powered on or powered off without affecting work of the resource control node. Further, an improvement on the resource control node may further implement the following related function of the computing node when it is powered off. For example:

After a power-off operation is performed on the computing node or the computing node enters an energy saving mode of an operating system, the resource control node is further configured to receive, by using the network interface, an access request from another computing node, for the local storage device, and perform an operation related to the access request.

Alternatively, the resource control node may further include a service interface, and after a power-off operation is performed on the computing node, the resource control node is further configured to receive, from an application by using the service interface, an access request for the storage resource of the computing node, and perform, by using the resource interface, a storage operation on the storage resource.

In the foregoing two preferred and further embodiments, on the one hand, after a local computing node is powered off or an energy saving operation is implemented, an interface is still retained for an upper-layer service in case of emergency use by the upper-layer service; on the other hand, an access request sent by another computing node may be received by using a network interface, so that ater the local computing node is powered off or an energy saving operation is performed, a local storage device is still available.

In this embodiment of the present application, the converged server described above can be obtained by reconstructing an existing X86 server. For example, the computing node 20 described above is implemented by reconstructing a function of a processor of the existing X86 server; in addition, a new node, that is, the resource control node 10 described above, is added to the existing X86 server, and the resource control node may specifically be implemented by adding one or more ARM processors.

Figure 2A:
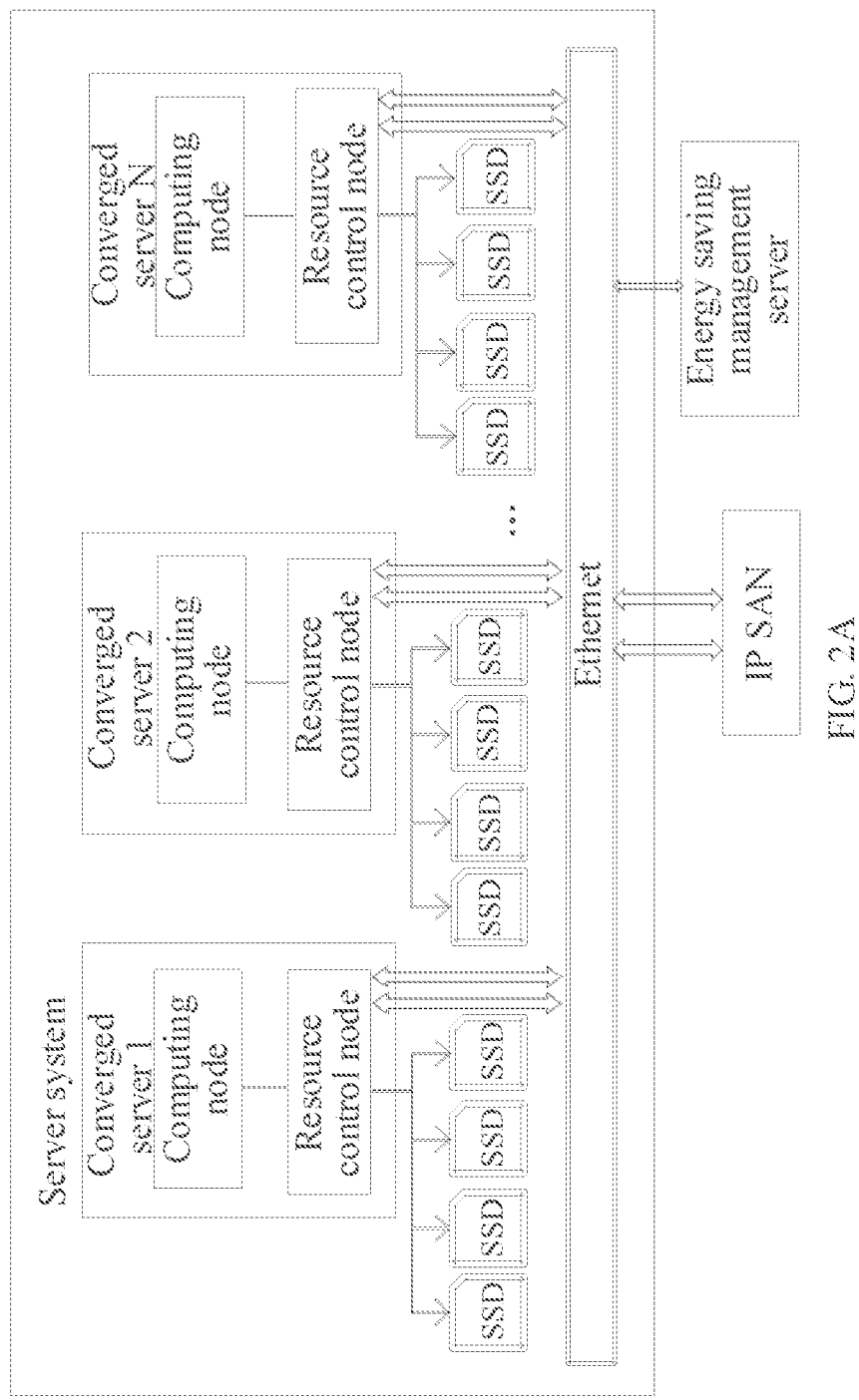
FIG. 2A and FIG. 2B are schematic diagrams of a server system according to an embodiment of the present application.

FIG. 2A is a schematic diagram of a server system formed by multiple node interconnection apparatuses (converged servers) that are interconnected according to an embodiment of the present application. A general service form of the server system is a data center. This embodiment of the present application uses an example in which N converged servers are interconnected to form a server system. The server system includes converged servers 1, 2, . . . , and N, where each converged server includes the resource control node and the computing node shown in FIG. 1C, a network interface of each converged server is connected by using the Ethernet, and each converged server may include a respective local storage device. The resource control node in at least one converged server in the server system has a shared storage scheduling function, and can form a shared storage resource pool by using the local storage device of each converged server connected to the Ethernet. The shared storage resource pool is divided into N virtual disks that are allocated to each computing node in the server system (certainly, a quantity of virtual disks is not fixed as a 1:1 configuration, and some computing nodes may be configured with multiple virtual disks). It should be noted that, in FIG. 2A, the converged server shown in FIG. 1(C is used, but in practice, converged servers that form the server system may be in multiple forms. Any one shown in FIG. 1A, FIG. 1B, or FIG. 1C is acceptable, or a converged server that is an obvious variant of FIG. 1B is acceptable, where the resource control node includes only a network interface and does not include a storage interface, and by using the network interface, the resource control node accesses another converged server instead of accessing network storage.

Generally, for an internal interconnection network in the server system described above, the interconnection network is based on the Ethernet, or may be based on another type of interconnection work, for example, InfiniBand. The network interface provided by the resource control node can implement interconnection between converged servers, and for a networking manner, a self-organizing network between resource control nodes may be used, or a connection with a switch module may be used. A self-organizing network manner may support various topology structures, for example, various networking manners such as FullMesh, 2D Torus, 3D Torus, and CLOS.

In addition, the server system described above may further include an energy saving management server configured to implement energy saving management of the server system. For example, the energy saving management server accepts registration of a resource control node in the server system, acquires a startup state of the resource control node in the server system, acquires load information of computing nodes in the server system, and determines, according to the startup state of the resource control node or the load information of the computing nodes, which energy saving operation, for example, a power-on operation, a power-off operation or an operation of entering a running state of a power saving mode, is to be performed on which computing node. A method of energy saving management is described in a specific embodiment in the following. For the energy saving management server, a server may be separately disposed in the server system to implement a function of the energy saving management server, or instead of separately disposing a server, a resource management node in any converged server may be selected to implement a function of the management server. Specifically, the energy saving management server may implement energy saving management according to an energy saving policy that is set on the energy saving management server. The energy saving policy may include a startup state of a resource control node or load information of a computing node, and the energy saving policy may be flexibly set and updated any time.

FIG. 2A may further include at least one IP SAN network storage device to be used as a storage resource of the server system.

Figure 2B:
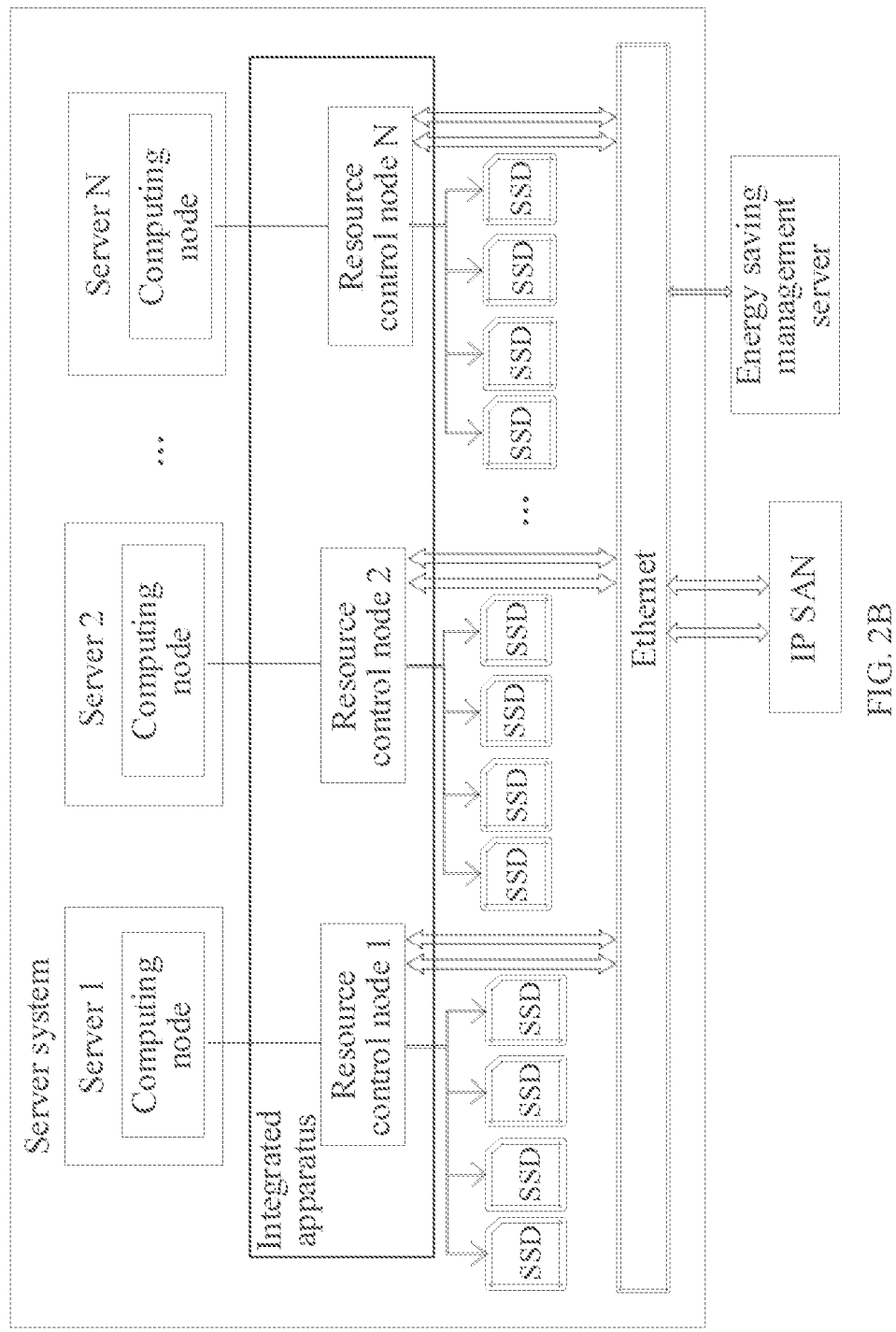

FIG. 2B is a schematic diagram of another server system according to an embodiment of the present application. The server system is formed by connecting an integrated apparatus formed by multiple resource control nodes to existing servers 1, . . . , and N. The integrated apparatus includes N resource control nodes, where N is a natural number greater than or equal to 1. The resource control nodes are interconnected (which may be connected by using a network or may be connected by using internal interconnection interfaces, and in this embodiment, connection by using a network is used as an example), and the interconnection apparatus further includes multiple device interconnection interfaces. In a preferred embodiment, each resource control node corresponds to one device interconnection interface, that is, in this embodiment, N device interconnection interfaces are included, so that one resource control node is connected to a computing node in one server by using one device interconnection interface.

In this embodiment of the present application, because of a decoupling design of the computing node and the resource control node, energy saving management of the computing node can be implemented flexibly. This embodiment of the present application provides two power supply systems when the resource control node and the computing node are interconnected, and in different power supply systems, an energy saving management method of the server systems shown in FIG. 2A and FIG. 2B is implemented in different manners, which are specifically described below.

A first power supply system for a node interconnection apparatus in which a resource control node and a computing node are interconnected according to an embodiment of the present application: A primary power device of the power supply system separately supplies power to the resource control node and the computing node. In such a power supply system, a power-on operation or a power-off operation can be separately performed on the computing node without affecting a normal working state of the resource control node. In a specific implementation, the primary power device may directly supply power to the resource control node, and supply power to the computing node by using a power switch. An initial state of the power switch is an off state by default, so as to achieve an effect that a power-on operation is performed on the computing node only after the resource control node is powered on. This means that, before a power-on operation is performed on the resource control node, the power switch opens a power supply circuit between the primary power device and the computing node.

Figure 3A:
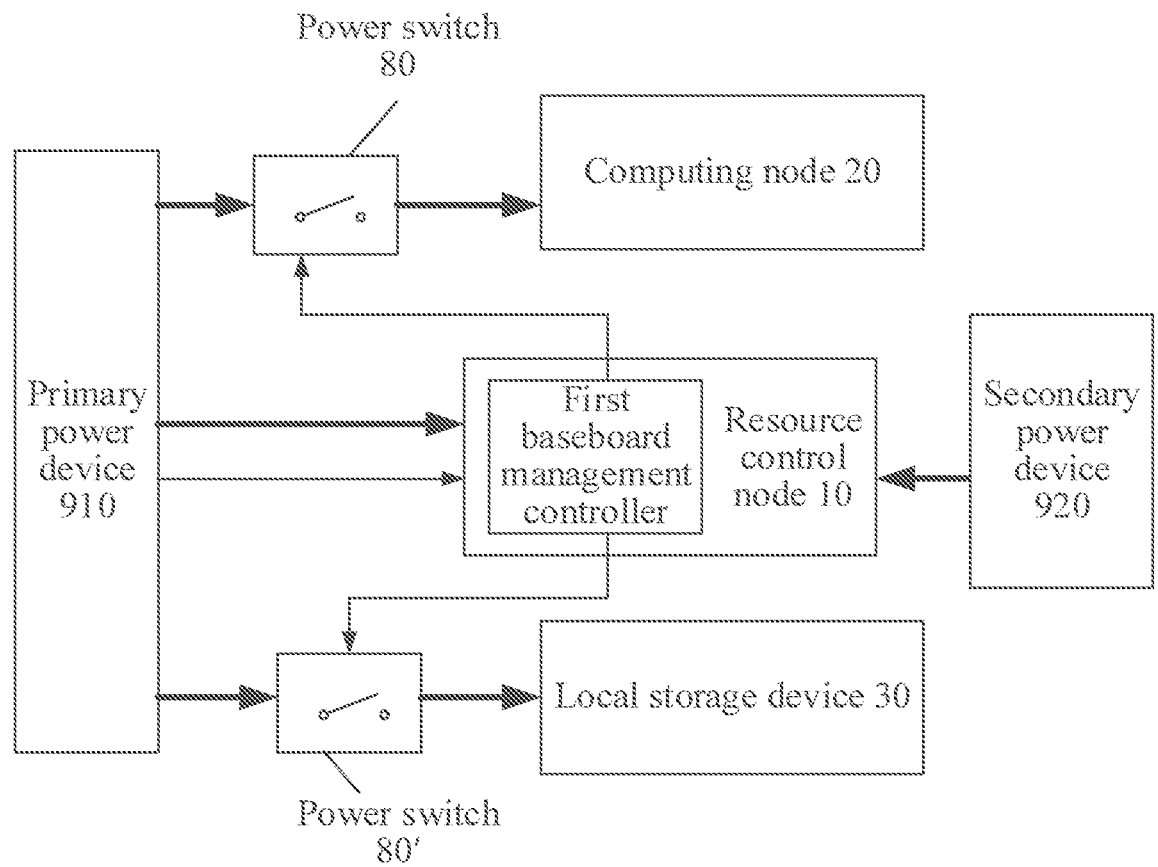
FIG. 3A and FIG. 3B are schematic block diagrams of a first power supply system for a node interconnection apparatus according to an embodiment of the present application.
Figure 3B:
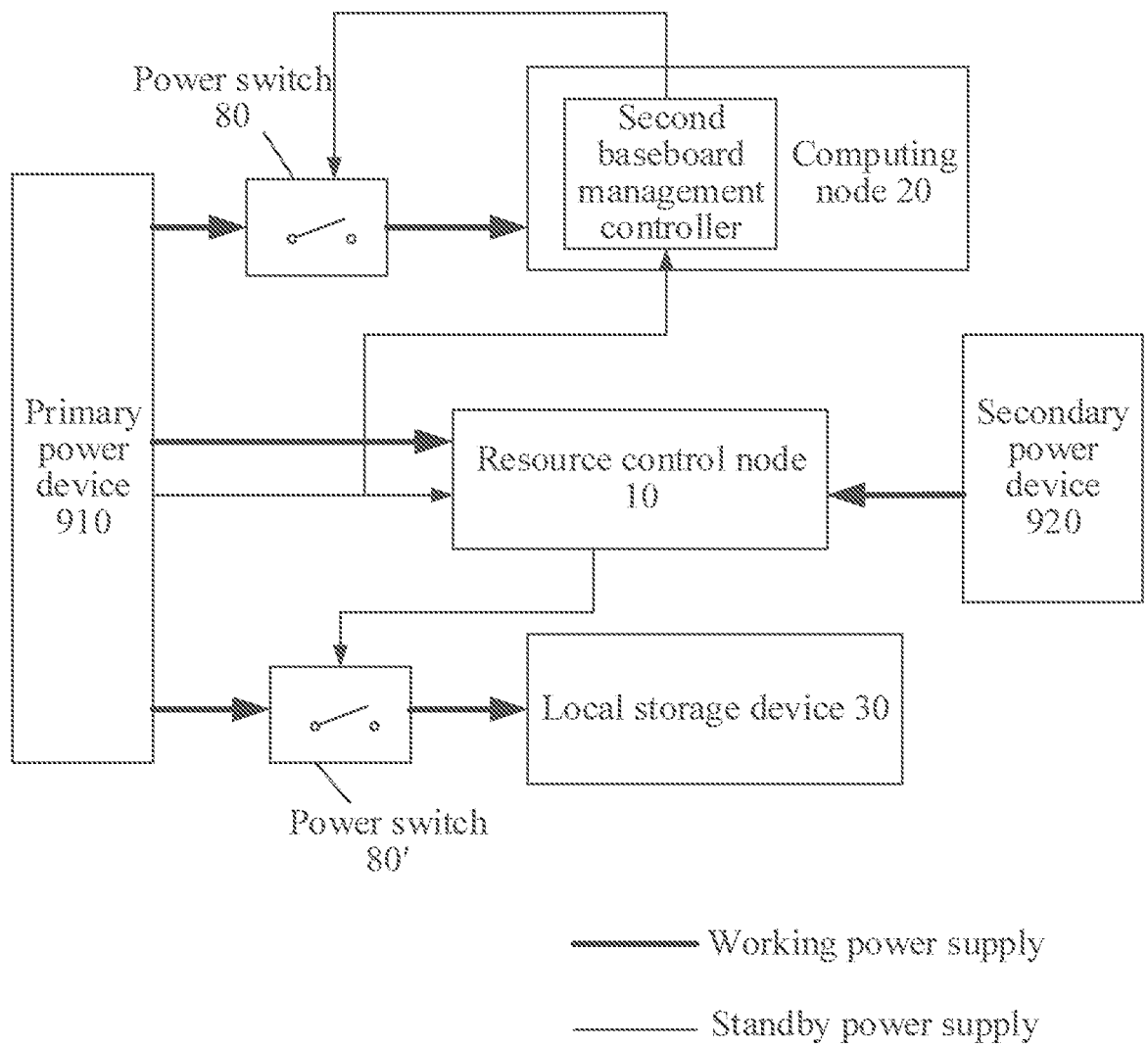

Shown in FIG. 3A and FIG. 3B are block diagrams of a first power supply system for a node interconnection apparatus in which a resource control node and a computing node are interconnected according to an embodiment of the present application.

As shown in FIG. 3A, the power supply system includes a primary power device 910 configured to separately supply power to a computing node 20 and a resource control node 10. After the primary power device 910 is started to supply power, the primary power device 910 first supplies power to the resource control node 10, and then supplies power to the computing node 20. Specifically, the primary power device 910 directly supplies power to the resource control node 10, a power switch 80 is further included between the primary power device 910 and the computing node 20, and the resource control node 10 is powered on when the primary power device 910 is started. The resource control node 10 is further provided with a first baseboard management controller that is connected to a management network and configured to control, by controlling a status of the power switch 80, a power-on operation or a power-off operation to be performed on the computing node 20. The first baseboard management controller controls the power switch 80 by using an intelligent platform management interface. The power supply system further includes a secondary power device 920 configured to supply power to the resource control node 10 when a fault occurs in the primary power device. A power switch 80' may also be used between the primary power device 910 and a storage device 30 to control a power-on operation or a power-off operation of the storage device 30.

The power switch 80 and power switch 80' described above may be implemented by using a mechanical power switch, or may be implemented by using a circuit controlled by a chip. Specific implementation may be flexibly set according to an actual requirement, and the power switch in this embodiment of the present application is not limited to a mechanical physical power switch.

The resource control node 10 in FIG. 3A is further provided with the first baseboard management controller connected to the management network. In fact, an implementation manner of an obvious variant of FIG. 3A is that the resource control node 10 is not provided with the first baseboard management controller. Because a power-on operation is already performed on the resource control node, the resource control node can obtain information about an energy saving management server in a network, and can make a decision of energy saving management by collecting related energy saving management information. Therefore, the resource control node 10 can also directly (without using a node such as a baseboard management controller) control, after a power-on operation is performed on the resource control node 10, the power switch 80 to close a power supply circuit between the primary power device and the computing node, so that a power-on operation is performed on the computing node. Correspondingly, after a power-on operation is performed on the computing node, the resource control node 10 may also control the power switch 80 to close the power supply circuit between the primary power device and the computing node, so that a power-off operation is performed on the computing node. The resource control node 10 may control the status of the power switch 80 according to a computing node power-on or power-off indication received from the energy saving management server, or make a decision of energy saving management according to information collected by the resource control node 10, and control the status of the power switch 80 according to the decision. The resource control node 10 makes the decision of energy saving management according to an energy saving policy, where the energy saving policy is similar to an energy saving policy of the energy saving management server.

FIG. 3B is the same as FIG. 3A, and the power supply system also includes a primary power device 910 that separately supplies power to a resource control node 10 and a computing node 20. Specifically, the primary power device 910 directly supplies power to the resource control node 10, and a power switch 80 is further included between the primary power device 910 and the computing node 20. A difference is that in FIG. 3B, the resource control node 10 is not provided with a first baseboard management controller, but the computing node 20 is provided with a second baseboard management controller. The power switch 80 is not controlled by the resource control node 10, but is controlled by the second baseboard management controller in the computing node 20.

The first baseboard management controller or the second baseboard management controller may be connected to a management network. They can be used to collect an energy saving management signal (a computing node power-on indication, a computing node power-off indication, or the like) sent by the energy saving management server. The energy saving management server introduced in this embodiment may be the energy saving management server shown in FIGS. 2A and 2B. The first baseboard management controller or the second baseboard management controller then control the power switch to open or close according to the received energy saving management signal (indication), so that the primary power device 910 disconnects or connects power supply to the computing node 20.

The energy saving management server determines, according to an energy saving policy, whether to perform a power-on operation or a power-off operation on the computing node 20. The energy saving policy may include: (1) After a power-on operation is already performed on a resource control node in a converged server, a power-on operation is performed on a computing node in the converged server; (2) after a power-on operation is performed on a resource control node in a converged server, when load of a computing node that is powered on in a server system is greater than a set threshold, a power-on operation is performed on a computing node in the converged server; (3) if load of a computing node in a converged server is less than a set threshold, a power-off operation is performed on the computing node in the converged server. The foregoing energy saving policies are only some examples, and are not intended to make an exhaustive list of energy saving policies in this embodiment of the present application.

The primary power device 910 supplies power to the resource control node 10 by using a direct current power supply and a standby power supply. The direct current power supply may provide a working voltage for startup of the resource control node 10, for example, a voltage of 12 V. The standby power supply provides a voltage lower than a working voltage to the first baseboard management controller in the resource control node 10 or the second baseboard management controller in the computing node 20, so that the first baseboard management controller or the second baseboard management controller remains in a working state. In FIG. 3B, the standby power supply may further be provided to the computing node 20 by using the resource control node 10.

Figure 4:
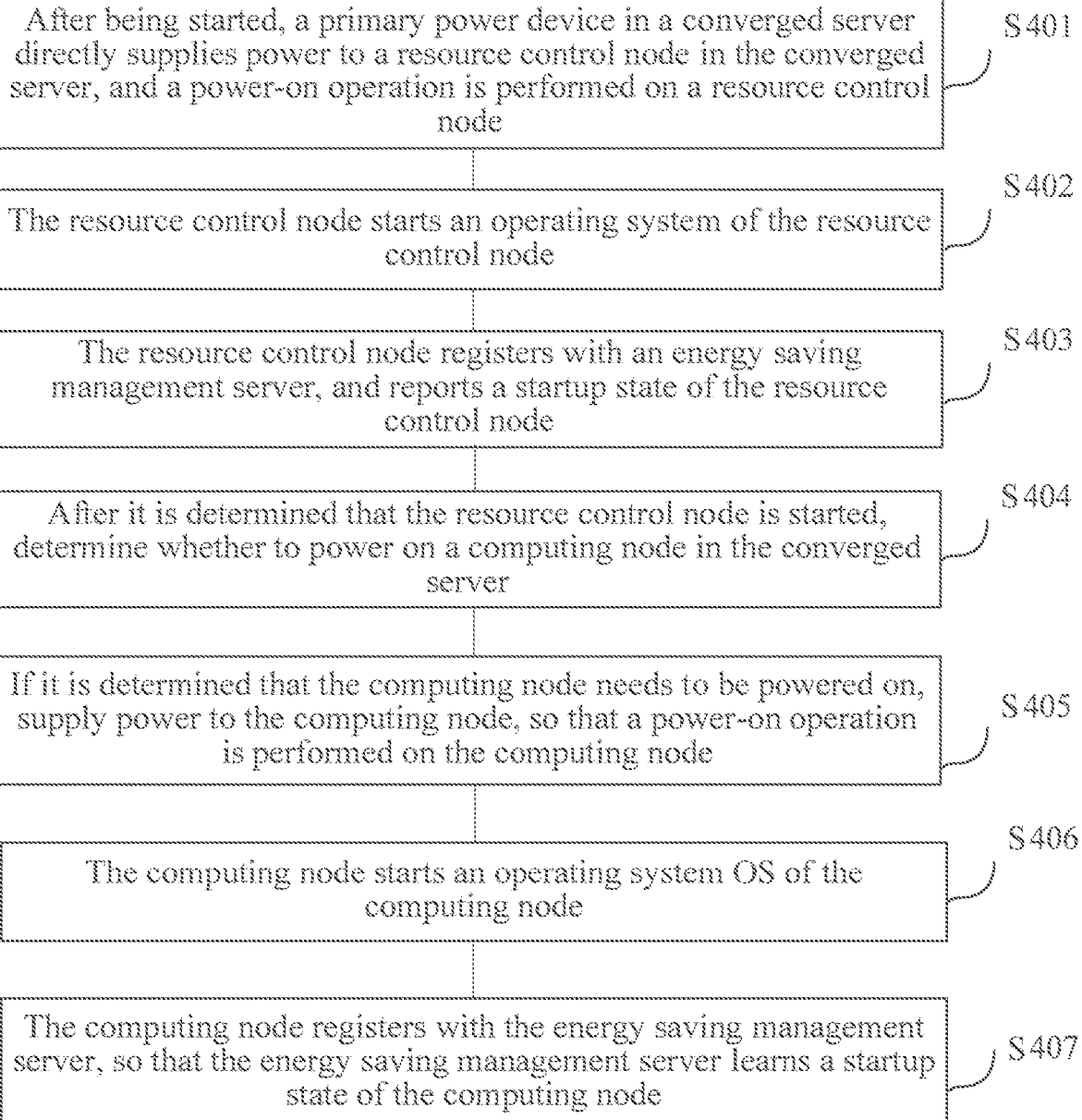
FIG. 4 is a flowchart of starting a node interconnection apparatus according to an embodiment of the present application.

If interconnection between the resource control node and the computing node uses the power supply system shown in FIG. 3A, the obvious variant of FIG. 3A, or FIG. 3B, an energy saving management method provided in this embodiment of the present application includes the following aspects:

(1) A startup manner of the resource control node and the computing node: The resource control node is first powered on, and then the computing node is powered on. As shown in FIG. 4, the manner includes:

S401: After being started, a primary power device in a converged server directly supplies power to a resource control node in the converged server, and a power-on operation is performed on the resource control node.

S402: The resource control node starts an operating system of the resource control node.

Specifically, after being started, the resource control node may further perform a self-check. If the system is provided with an energy saving management server, the resource control node may establish a connection with the energy saving management server, and register with the energy saving management server. The energy saving management server obtains a registration notification of the resource control node, and specifies a startup state of the resource control node according to the registration notification. Further, the resource control node may further perform initialization on a local storage device or a network device that is connected to the resource control node, or perform an operation of discovering another node and configure a shared storage resource. After an initialization configuration is performed, a storage device or a network device that is connected to the converged server can be identified and used.

S403: The resource control node registers with an energy saving management server, and reports a startup state of the resource control node.

This step is an optional step, and if the server system is not provided with the energy saving management server, the step may not be performed.

S404: After it is determined that the resource control node is started, determine whether to power on a computing node in the converged server.

Specifically, in the power supply system in FIG. 3A, the first baseboard management controller in the resource control node determines, according to a received computing node power-on indication, whether to power on the computing node in the converged server. In the power supply system in FIG. 3B, the second baseboard management controller in the computing node determines, according to a received computing node power-on indication, whether to power on the computing node in the converged server.

Because the first baseboard management controller or the second baseboard management controller is connected to the energy saving management server in the management network, the computing node power-on indication is from the energy saving management server. The energy saving management server sends the computing node power-on indication to the first baseboard management controller or the second baseboard management controller according to an energy saving policy. The energy saving policy may include: determining whether the resource control node in the converged server is started; if yes, it may be directly determined that the computing node needs to be powered on. After it is determined that the resource control node is started, the energy saving management server may also further determine, according to collected load information of each computing node in the server system, whether the computing node needs to be powered on. For example, if load of each computing node in the server system is heavy, the computing node needs to be powered on, or if load of each computing node is light, the computing node may not need to be powered on in this case even though the resource control node is started.

S405: If it is determined that the computing node needs to be powered on, supply power to the computing node, so that a power-on operation is performed on the computing node.

Specifically, the first baseboard management controller or the second baseboard management controller controls a power switch in the converged server, so that the primary power device supplies power to the computing node.

The following steps are optional steps, which are a startup process and a registration process of the computing node. Startup in this embodiment of the present application includes powering on a node and starting an operating system.

S406: The computing node starts an operating system (OS) of the computing node.

Specifically, the computing node enters a boot program of a BIOS, finds the resource control node by means of scanning, acquires a virtual disk provided by the resource control node, acquires an OS image of the virtual disk, starts the operating system according to the OS image, and installs a driver program of the resource control node.

S407: The computing node registers with the energy saving management server, so that the energy saving management server learns a startup state of the computing node.

In the foregoing startup manner of the resource control node and the computing node, the resource control node is first powered on and started, and then it is determined whether the computing node is to be powered on. In an architecture in which the resource control node and the computing node are separated, it can be implemented that the computing node is started without an OS disk. In addition, a power-on operation may be performed on the computing node only when there is a specific use requirement of the computing node, thereby avoiding a waste of resources and reducing energy consumption.

Figure 5:
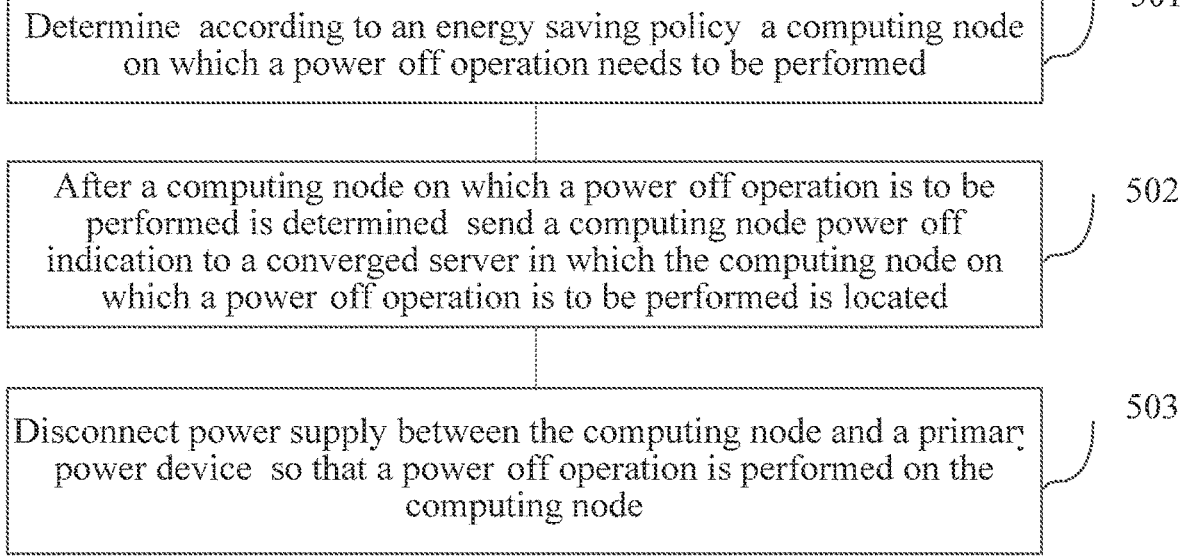
FIG. 5 is a flowchart of a power-off operation of a computing node in a node interconnection apparatus according to an embodiment of the present application.

(2) A power-off manner of the computing node: It may be implemented that the resource control node determines to disconnect power supply to the computing node in the converged server or disconnects, according to an energy saving management signal, power supply to the computing node in the converged server, so that a power-off operation is performed on the computing node without affecting a working state in which the resource control node remains. As shown in FIG. 5, the manner includes:

S501: Determine, according to an energy saving policy, a computing node on which a power-off operation needs to be performed.

Specifically, the resource control node or the energy saving management server may determine, according to load information of the computing node, whether the computing node needs to be powered off. If it is determined that load of a computing node is less than a set threshold, a working task performed in the computing node may be performed first or migration of a running virtual machine (VM) may be performed first, and after the migration is completed, it may be determined that a power-off operation can be performed on the computing node.

S502: Ater a computing node on which a power-off operation is to be performed is determined, send a computing node power-off indication.

Specifically, in the power supply system in FIG. 3A, the first baseboard management controller in the resource control node receives the computing node power-off indication, and in the power supply system in FIG. 3B, the second baseboard management controller in the computing node receives the computing node power-off indication.

S503: Disconnect power supply between the computing node and a primary power device, so that a power-off operation is performed on the computing node.

Specifically, in the power supply system in FIG. 3A, the first baseboard management controller in the resource control node turns off or turns on a power switch in the converged server according to a received energy saving management signal, so that the primary power device disconnects power supply to the computing node. In the power supply system in FIG. 3B, the second baseboard management controller in the computing node turns off or turns on a power switch in the converged management server according to a received energy saving management signal, so that the primary power device disconnects power supply to the computing node.

In the first power supply system described above, the primary power device separately supplies power to the resource control node and the computing node. Therefore, when energy saving is required, the computing node may not be powered on or a power-off operation is performed on the computing node to save energy, and when the computing node needs to perform a related computing task, a power-on operation may be performed on the computing node according to a requirement.

For the first power supply system described above, because the power supply circuit is improved, an implementation manner of a newly provided converged server may be preferably used. If the resource control node in this embodiment of the present application is implemented only by reconstructing an existing server, an existing circuit may further be used for the implementation, and description is provided in the following.

A second power supply system for a node interconnection apparatus in which a resource control node and a computing node are interconnected according to an embodiment of the present application: Power supply to the resource control node depends on the computing node, or the resource control node and the computing node are interconnected in a same power supply circuit, and the resource control node and the computing node simultaneously obtain a power supply voltage of a primary power device.

Figure 6A:
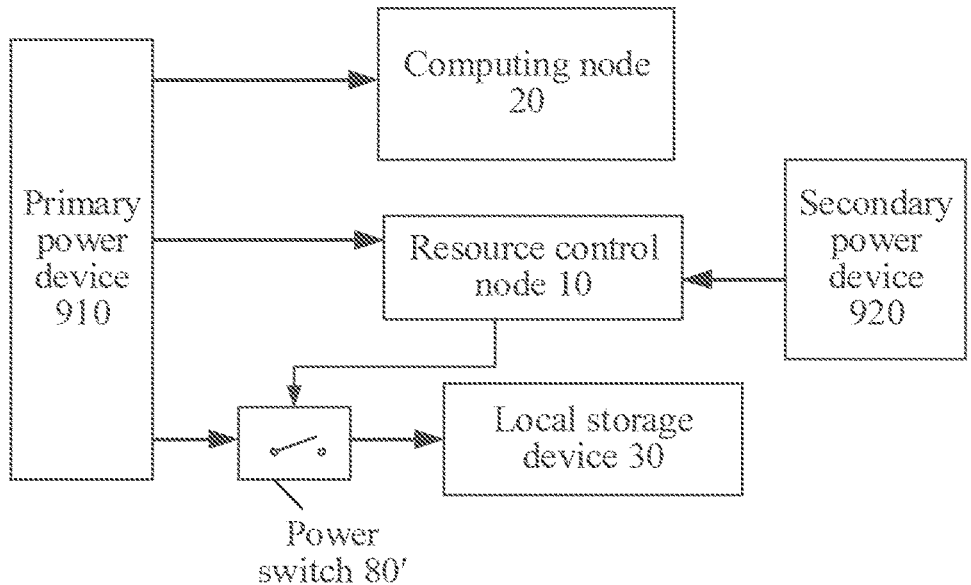

FIG. 6A and FIG. 6B are block diagrams of a second power supply system for a converged server according to an embodiment of the present application.

In FIG. 6A and FIG. 6B, the power supply system still includes a primary power device 910. The primary power device 910 simultaneously supplies power to a resource control node 10 and a computing node 20. When the computing node 20 is powered on, the resource control node also obtains power supplied by the primary power device. A specific implementation manner is that the resource control node 10 is installed in a general rack server (where an existing processor in the rack server may be deemed as the computing node 20). The resource control node 10 is arranged in the rack server as a standard board or in a manner of inserting a card, and then a hard disk signal line that is connected to an original RAID card is connected to a hard disk connection interface of the resource control node.

If the power supply system shown in FIG. 6A and FIG. 6B is used, an energy saving management method provided in this embodiment of the present application includes the following aspects:

(1) A startup manner of the resource control node and the computing node: The resource control node is first started, and then the computing node is started. As shown in FIG. 7, the manner includes:

S701: After being started, a primary power device simultaneously supplies power to a resource control node and a computing node, and a power-on operation is separately performed on the resource control node and the computing node.

S702: After being powered on, the computing node acquires startup mode information during startup, and enters a power saving mode of a BIOS according to the startup mode information.

In this embodiment of the present application, the power saving mode of the BIOS mainly indicates that during startup of the BIOS, the computing node does not enter a boot mode of the BIOS to start an OS of the computing node. Therefore, although the computing node is powered on, the computing node enters a running state of the BIOS with low power consumption.

Specifically, in this embodiment of the present application, startup mode information may be preset in the resource control node; for example. Option Rom control of the resource control node is used. The startup mode information may be set to a fixed value, for example, be directly preset to the power saving mode of the BIOS. The startup mode information may also be preset to a condition value, for example, the power saving mode of the BIOS is used when the resource control node is not started, and the boot mode of the BIOS is used when the resource control node is started.

For step 702, there are two implementation manners according to different settings of the preset startup mode information in the resource control node.

A first implementation manner: If the startup mode information preset in the resource control node is the fixed value, during startup, the computing node starts the BIOS, scans, in the boot mode of the BIOS, a device that is connected to the computing node, and when the resource control node is found by means of scanning, acquires the power saving mode of the BIOS preconfigured in the resource control node. Therefore, after being powered on, the computing node does not directly start the OS, but enters the power saving mode of the BIOS according to the acquired startup mode information.

A second implementation manner: If the startup mode information preset in the resource control node is the condition value, during startup, the computing node starts the BIOS, scans, in the boot mode of the BIOS, a device that is connected to the computing node, and when the resource control node is found by means of scanning, acquires the startup mode information preconfigured in the resource control node. Further, the BIOS detects a status of the resource control node. If it is determined that the resource control node is not started, after the computing node is powered on, the computing node does not directly start the OS, but enters the power saving mode of the BIOS according to the acquired startup mode information.

S703: After being powered on, the resource control node starts an OS of the resource control node.

Specifically, after being started, the resource control node may further perform a self-test. If the system is provided with an energy saving management server, the resource control node may establish a connection with the energy saving management server, and register with the energy saving management server. The energy saving management server obtains a registration notification of the resource control node, and specifies a startup state of the resource control node according to the registration notification. Further, the resource control node may further perform initialization on a local storage device or a network device that is connected to the resource control node, or perform an operation of discovering another node and configure a shared storage resource. After an initialization configuration is performed, a storage device or a network device that is connected to the converged server can be identified and used.

S704: After it is determined that the resource control node is started, the computing node is switched from the power saving mode of the BIOS to a boot mode of the BIOS, and booted by the BIOS, starts an OS of the computing node.

Specifically, corresponding to the two modes in step 702, step 704 described above correspondingly has two specific implementation manners.

A first implementation manner: If the startup mode information preset in the resource control node is the fixed value, after being started, the resource control node changes the preset startup mode information from the power saving mode of the BIOS to the boot mode of the BIOS, and instructs the computing node to restart. The computing node restarts, and the BIOS acquires the startup mode information in the resource control node. Because the startup mode information is changed to the boot mode of the BIOS, the computing node, booted by the BIOS, starts the operating system of the computing node.

A second implementation manner: If the startup mode information preset in the resource control node is the condition value, the computing node detects the status of the resource control node; if it is determined that the resource control node is in a started state, the BIOS of the computing node is switched from the power saving mode to the boot mode, and the computing node starts the OS of the computing node in the boot mode of the BIOS.

S705: After being started, the resource control node or the computing node registers with an energy saving management server, so that the energy saving management server learns a startup state of the computing node.

Step 705 is an optional step. If a server system is provided with an energy saving management server, the resource control node or the computing node notifies the energy saving management server of a status of the resource control node or the computing node after being started, so that the energy saving management server performs subsequent energy saving management according to a preset energy saving policy and by taking the status of the resource control node or the computing node into consideration. In order to implement communication with the energy saving management server, a baseboard management controller may be separately disposed in the resource control node or the computing node.

(2) A manner of an energy saving operation of the computing node: After both the computing node and the resource control node are powered on and started, when it is determined that load of the computing node is relatively light, an energy saving operation may further be performed on the computing node. Because in the second power supply system, power supply to the resource control node and power supply to the computing node depend on each other, it is relatively difficult to implement that a power-off operation is performed on the computing node without affecting normal working of the resource control node. Therefore, in the second power supply system, an energy saving operation is not implemented by powering off the computing node, but a baseboard management controller in the computing node is used to implement a reset or sleep of the computing node, so that an energy saving operation is performed on the computing node. The baseboard management controller may receive an energy saving operation indication of the resource control node to perform an energy saving operation, or may directly receive an energy saving management indication sent by the energy saving management server to perform an energy saving operation.

A possible energy saving management manner is: If the energy saving management server determines that an energy saving operation needs to be performed, the energy saving management server may send an energy saving operation indication to a corresponding computing node, so that the corresponding computing node enters an energy saving mode of an operating system, for example, sleep or a reset.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present application, "B corresponding to A" indicates that B is associated with A. and B may be determined according to A. However, it should be further understood that determining B according to A does not mean that B is determined only according to A, and B may further be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

In the embodiments provided in the present application, it should be understood that the disclosed system may be implemented in other manners. For example, the described system embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the nodes or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present application.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of the present application. The foregoing storage medium includes: any medium that can store program code, such as a USB flash drive, a removable hard disk, a read-only memory (ROM), a random-access memory (RAM), a magnetic disk, or an optical disc.

The foregoing descriptions are merely specific embodiments of the present application, but are not intended to limit the protection scope of the present application. Any modification or replacement readily figured out by a person skilled in the art within the technical scope disclosed in the present application shall fall within the protection scope of the present application. Therefore, the protection scope of the present application shall be subject to the protection scope of the claims.

What is claimed is:

1. A node interconnection apparatus comprising:
a computing node configured to operate as a server and comprising:
a first processor; and
a first memory;
a local storage device;
an integrated apparatus comprising resource control nodes that are interconnected, wherein each of the resource control nodes comprises a second processor and a second memory, wherein the resource control nodes comprise a first resource control node, wherein the first resource control node comprises a network interface, and wherein the integrated apparatus is configured to:
obtain a first storage resource from the local storage device;
provide the first storage resource to the computing node;
obtain second storage resources from external storage devices through the network interface;
split the second storage resources into virtual disks;
allocate the virtual disks to the computing node; and
provide an operation system mirror from the virtual disks to the computing node for operating system startup at the computing node; and
a device interconnection interface comprising a bus interface configured to connect the integrated apparatus to the computing node.

2. The node interconnection apparatus of claim 1, wherein the integrated apparatus is further configured to perform a power-on operation or a power-off operation on the computing node without affecting a working state of the first resource control node.

3. The node interconnection apparatus of claim 1, wherein the computing node is further configured to generate input/output (IO) requests.

4. The node interconnection apparatus of claim 3, wherein the integrated apparatus is further configured to manage a bandwidth required by the IO requests to meet a quality of service (QoS) requirement of the computing node.

5. The node interconnection apparatus of claim 1, wherein the device interconnection interface is a Peripheral Component Interconnect Express (PCIe) interface.

6. The node interconnection apparatus of claim 1, wherein the network interface is an Ethernet interface.

7. The node interconnection apparatus of claim 1, wherein the network interface is an InfiniBand (IB) interface.

8. The node interconnection apparatus according to claim 1, wherein the first processor includes an X86 processor, and wherein the second processor includes an ARM processor.

9. The node interconnection apparatus according to claim 1, wherein the integrated apparatus is further configured to perform redundant array of independent disks (RAID) operations.

10. The node interconnection apparatus according to claim 1, wherein the local storage device comprises a hard disk drive (HDD) or a solid-state drive (SSD).

11. The node interconnection apparatus according to claim 1, wherein each of the external storage devices comprises an Internet Protocol (IP) storage area network (SAN).

12. An integrated apparatus of a node interconnection apparatus and comprising:
   resource control nodes that are interconnected,
   wherein each of the resource control nodes comprises a second processor and a second memory,
   wherein the resource control nodes comprise a first resource control node,
   wherein the first resource control node comprises a network interface, and
   wherein the integrated apparatus is configured to:
      connect to a server of the node interconnection apparatus via a bus interface of a device interconnection interface of the node interconnection apparatus;
      obtain a first storage resource from a local storage device of the node interconnection apparatus;
      provide the first storage resource to the server;
      obtain second storage resources from external storage devices through the network interface;
      split the second storage resources into virtual disks;
      allocate the virtual disks to the server; and
      provide an operation system mirror from the virtual disks to the server for operating system starting at the server.

13. The integrated apparatus of claim 12, wherein the integrated apparatus is further configured to perform a power-on operation or a power-off operation on the server without affecting a working state of the first resource control node.

14. The integrated apparatus of claim 12, wherein the integrated apparatus is further configured to receive input/output (IO) requests from the server.

15. The integrated apparatus of claim 14, wherein the integrated apparatus is further configured to manage a bandwidth required by the IO requests to meet a quality of service (QoS) requirement of the server.

16. The integrated apparatus of claim 12, wherein the device interconnection interface is a Peripheral Component Interconnect Express (PCIe) interface.

17. The integrated apparatus of claim 12, wherein the network interface is an Ethernet interface or an InfiniBand (IB) interface.

18. The integrated apparatus according to claim 12, wherein a first processor of the server includes an X86 processor, and wherein the second processor includes an ARM processor.

19. The integrated apparatus according to claim 12, wherein the integrated apparatus is further configured to perform redundant array of independent disks (RAID) operations.

20. The integrated apparatus according to claim 12, wherein each of the external storage devices comprises an Internet Protocol (IP) storage area network (SAN).

* * * * *